(12) United States Patent
Bruhn et al.

(10) Patent No.: US 10,760,667 B2
(45) Date of Patent: Sep. 1, 2020

(54) TRANSMISSION HOUSING UNIT HAVING AN AXIAL DISK

(71) Applicant: NIDEC MOTORS & ACTUATORS (GERMANY) GMBH, Bietigheim-Bissingen (DE)

(72) Inventors: Rainer Bruhn, Ingersheim (DE); Jian Yang, Walheim (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 0 days.

(21) Appl. No.: 16/657,107

(22) Filed: Oct. 18, 2019

(65) Prior Publication Data

US 2020/0124158 A1 Apr. 23, 2020

(30) Foreign Application Priority Data

Oct. 19, 2018 (DE) .................... 10 2018 126 055

(51) Int. Cl.
*F16H 57/021* (2012.01)
*F16H 57/031* (2012.01)
*F16H 57/12* (2006.01)
*F16H 57/025* (2012.01)
*F16H 57/039* (2012.01)
*F16H 57/02* (2012.01)

(52) U.S. Cl.
CPC ......... *F16H 57/021* (2013.01); *F16H 57/031* (2013.01); *F16H 57/039* (2013.01); *F16H 2057/0213* (2013.01); *F16H 2057/02034* (2013.01); *F16H 2057/02082* (2013.01)

(58) Field of Classification Search
CPC . F16H 2057/02034; F16H 2057/02082; F16H 2057/0213; F16H 57/021; F16H 57/031; F16H 57/039
See application file for complete search history.

(56) References Cited

U.S. PATENT DOCUMENTS 3,549,218 A * 12/1970 Cagnon .................. F16C 17/08
384/425
3,848,477 A 11/1974 Giandinoto
(Continued)

FOREIGN PATENT DOCUMENTS

DE 2635061 A1 2/1978
DE 3521160 A1 12/1986
(Continued)

OTHER PUBLICATIONS

Define poka yoke principle, Google Search, Mar. 20, 2020 (Year: 2020).*

*Primary Examiner* — Vinh Luong
(74) *Attorney, Agent, or Firm* — Lucas & Mercanti, LLP; Klaus P. Stoffel

(57) ABSTRACT

In a transmission housing unit having a housing base body for a shaft, which is supported with a compensating arrangement between a second end face and a second guide surface. The compensating arrangement has an axial disk. The axial disk and the housing base body have corresponding geometric unbalances in accordance with the poka-yoke principle such that the axial disk is only insertable in a single orientation into the housing base body in the assembly condition.

8 Claims, 4 Drawing Sheets

(56) References Cited

U.S. PATENT DOCUMENTS

| | | | |
|---|---|---|---|
| 6,805,024 B1 * | 10/2004 | Shufflebarger | F16C 17/10 |
| | | | 49/324 |
| 7,034,421 B1 | 4/2006 | Walther | |
| 7,467,565 B2 | 12/2008 | Oberle | |
| 2009/0206644 A1 * | 8/2009 | Ishii | B60N 2/0232 |
| | | | 297/362 |
| 2014/0298938 A1 * | 10/2014 | Arndt | B60N 2/067 |
| | | | 74/409 |
| 2016/0208908 A1 | 7/2016 | Huck et al. | |
| 2020/0124164 A1 * | 4/2020 | Bruhn | F16H 57/025 |

FOREIGN PATENT DOCUMENTS

| | | |
|---|---|---|
| DE | 19520886 C1 * | 10/1996 |
| DE | 102013216130 A1 | 2/2015 |
| DE | 102015209532 A1 | 11/2016 |
| DE | 102018100458 A1 * | 11/2019 |
| EP | 0563410 A1 * | 6/1993 |
| EP | 1546576 B1 | 11/2006 |

* cited by examiner

TRANSMISSION HOUSING UNIT HAVING AN AXIAL DISK

CROSS-REFERENCE TO RELATED APPLICATIONS

The present application claims priority of DE 10 2018 126 055.5, filed Oct. 19, 2018, the priority of this application is hereby claimed and this application is incorporated herein by reference.

BACKGROUND OF THE INVENTION

The invention relates to a transmission housing unit having an axial disk of a compensating arrangement for compensating axial play for the transmission housing unit.

A transmission drive unit, in particular for the displacement of movable parts in a motor vehicle, having a transmission housing and a shaft which is mounted therein along a longitudinal axis and which is supported by an axial stop surface on a counter stop surface on said housing, is known e.g. from EP 1 546 576 B1. In order to produce an axial force, at least one of the stop surfaces is inclined at an angle of inclination counter to a plane perpendicular to the longitudinal axis and a component, which interacts with at least one of the stop surfaces, is arranged such that it is displaceable perpendicular to the longitudinal axis. The component is displaceable by means of a pre-stressed elastic element radially to the longitudinal axis, wherein the friction coefficient between the at least one stop surface and the component for a movement to lower the axial force is greater than the tangent of the angle of inclination. As an integral part of the component, the elastic element is configured together with said component to form a bent and punched part.

SUMMARY OF THE INVENTION

The object of the present invention is to indicate improvements in terms of a transmission housing unit.

The transmission housing unit contains a compensating arrangement. Said compensating arrangement serves to compensate an axial play (axial play compensation) for a shaft within the transmission housing unit. The invention assumes that the transmission housing unit is designed or set up as intended for the shaft with specific characteristics. The transmission housing unit accordingly contains a housing base body for receiving the shaft extending along an axial direction, in particular an output shaft. The shaft is mounted such that it is rotatable about the axial direction in the housing base body. The housing base body has a first guide surface which points in a direction opposite to the axial direction which runs transversely to the axial direction. The housing base body has a second guide surface which points in the axial direction and runs obliquely to the axial direction.

"As intended" means that the transmission housing unit is constructively adapted to a specific shaft or a specific type of shaft and is provided there for the deployment thereof; e.g. it is designed for the geometry requirements specified by this, etc.

The first guide surface therefore runs, in particular, perpendicular to the axial direction, the second guide surface is inclined by an angle of inclination (in particular less than 60°, less than 45°, less than 30°) counter to a plane perpendicular to the axial direction.

The shaft is supported with a first end face on the first guide surface. The shaft is supported with a second end face—in the assembly condition—on the second guide surface, with the interposition of the compensating arrangement. The support can be provided in each case directly or with the interposition of further parts, e.g. bearings, sliding surfaces, etc. The shaft is consequently supported or guided or braced between the two guide surfaces. In order to be supported or enclosed between the second end face and the second guide surface, the compensating arrangement has at least two opposite flat sides on its axial outer surfaces. Further flat sides are then "inner" flat sides, as explained in greater detail below.

The compensating arrangement is configured in the shape of a wedge. In order to compensate the axial play of the shaft, the compensating arrangement—or in the event that the latter has multiple parts, at least one part of said arrangement—is displaceable along the second guide surface in a feed direction transversely to the axial direction. Due to the displacement, a distance between the second guide surface and the second end face is increased in the manner of a wedge gear (wedge-shaped compensating arrangement and oblique second guide surface) and, as a result, any play is decreased or reduced to zero. In other words, the compensating arrangement forms a wedge system for compensating the play of the shaft in the housing base body.

In particular, the transmission housing unit contains a spring element which is pre-stressed in the feed direction, which spring element is arranged between a blunt end (thicker side of the wedge shape) of the compensating arrangement and the housing base body. Pressure is therefore applied by the spring element to the compensating arrangement in order to advance the latter in the feed direction. The compensating arrangement is therefore readjusted or any play between the shaft and the housing base body is reduced.

The compensating arrangement has a wedge-shaped wedge element resting on the second guide surface and a plane parallel axial disk resting on the second end face. The compensating arrangement therefore contains a total of four flat sides, including two internal or inner flat sides, which rest on one another.

As a result of such a division of the compensating arrangement into two elements, these can be optimized in terms of their respective intended purpose. In particular, the friction bearing between the axial disk and the shaft can thus be optimized in terms of e.g. low friction, high stability, good lubrication characteristics, etc. The wedge element can, on the other hand, be optimized e.g. in terms of costs, stability, material etc. The wedge element is therefore clamped between the second guide surface and the axial disk. In particular, the wedge element grasps the shaft at least in a U-shaped or arc-shaped manner.

The axial disk and the housing base body have corresponding geometric unbalances in accordance with the poka-yoke principle such that the axial disk is only insertable in a single orientation into the housing base body in the assembly condition, or another insertion is geometrically or mechanically prevented.

As a result of the poka-yoke principle, the axial disk is not insertable into the transmission housing unit in a different orientation ("wrongly") to the desired orientation ("correctly", "properly"), or the transmission housing unit cannot be completed if the axial disk has been inserted wrongly. In particular, further erection is then geometrically or mechanically prevented, e.g. the axial disk cannot be inserted into a base part at all, further components cannot be installed or a housing lid cannot be closed.

The known advantages of the poka-yoke principle are produced; in particular, assembly defects are thus prevented during the erection of the transmission housing unit in terms of a wrong installation of the axial disk.

In a preferred embodiment, the unbalance is designed in the form of an orientation safeguard such that the axial disk is only insertable such that the desired first flat side thereof faces the second end face and the second flat side thereof faces the second guide surface.

A degree of freedom can thus remain to be able to insert the axial disk into the transmission housing unit at least in different rotational positions about the axial direction, as long as the orientation of the flat sides corresponds to the desired or proper orientation.

This thus produces at least the orientation safeguard, i.e. the axial disk is only insertable correctly such that one desired flat side thereof faces the second end face and the other flat side thereof faces the second guide surface.

In a preferred embodiment, the unbalance is designed in the form of an anti-turn locking device such that the axial disk is only insertable such that the rotational position thereof about the axial direction is fixed with respect to the housing base body.

At least an undesired twisting of the axial disk with respect to the housing base body is thus prevented.

In a preferred embodiment, the unbalance on the axial disk is formed by the unsymmetrical radial outer contour thereof, wherein the housing base body has a corresponding inner contour. In other words, a positive fit is formed between the axial disk and the housing base body in the desired orientation. In the case of undesired orientations, the axial disk and housing base body adjoin one another such that, for example, the axial disk is not introducible into the housing base body at all or a continuation of the assembly is prevented due to components not resting on one another as intended.

In a preferred variant of this embodiment, the radial outer contour is formed by an extension of the axial disk, which projects radially outwards, and the inner contour is formed by a receiving opening for the extension. Thus, the positive fit mentioned above can be executed in a particularly simple manner.

In a preferred variant of this embodiment, the housing base body contains a base part and a lid, and the unbalance is limited to a portion of the inner contour and the lid contains the corresponding unsymmetrical portion. Thus, a corresponding lid only has to be executed "unsymmetrically", which results in a simpler production of the base part.

In a preferred variant of this embodiment in connection with the aforementioned receiving opening, the lid contains the receiving opening. Thus, the unbalance on the lid is particularly simple to execute.

In a preferred embodiment, the axial disk has a rectangular basic form transversely to the axial direction, and the unbalance is executed as a deviation from the basic form. A corresponding shape results in a particularly simple and effective anti-turn locking device.

In a preferred variant of this embodiment, the deviation is the extension. It is particularly simple to mount an extension on a rectangular basic form.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
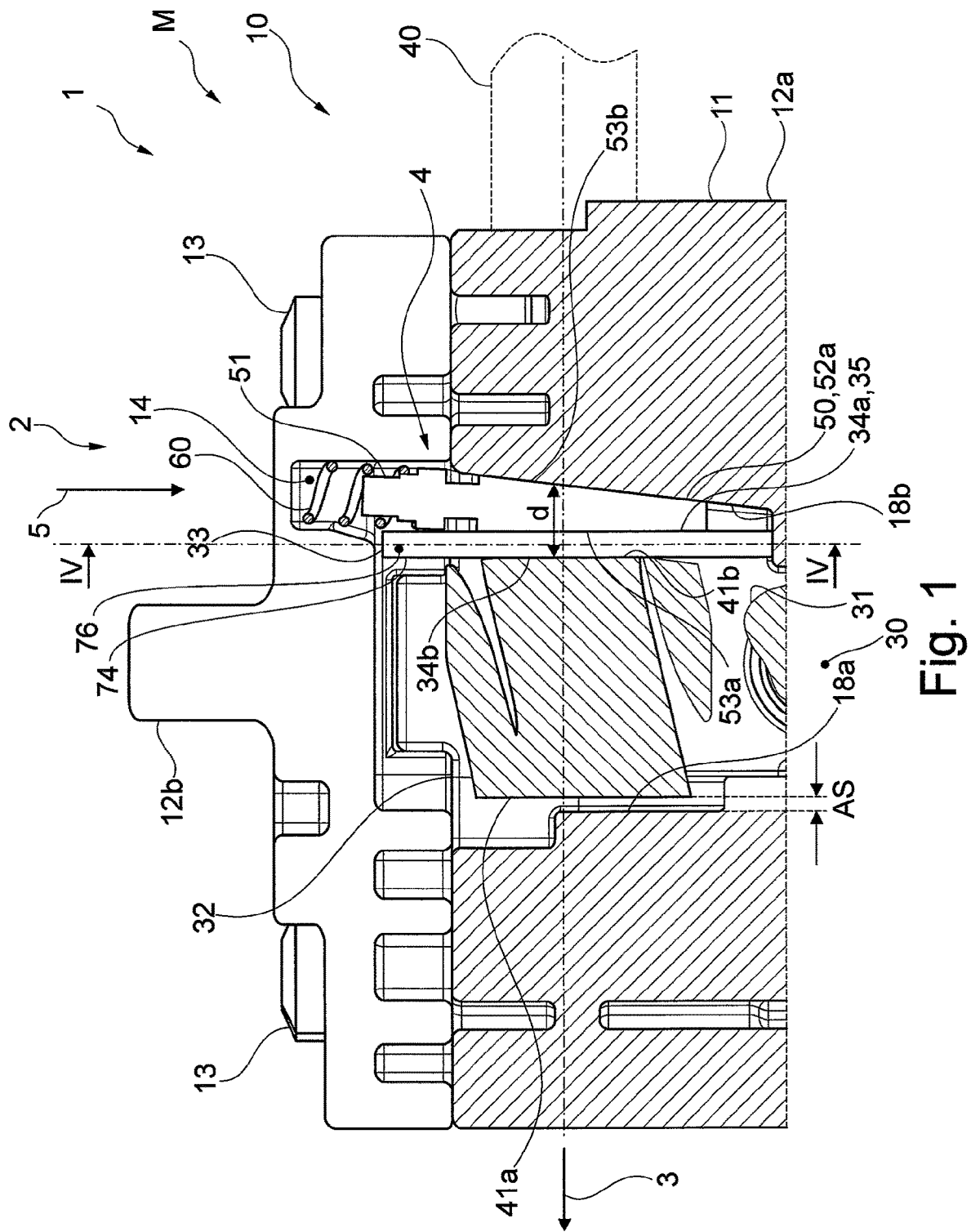
FIG. 1 shows a cross-sectional view, along the line I-I in FIG. 2, of a transmission unit having a transmission housing unit and a compensating arrangement.
Figure 2:
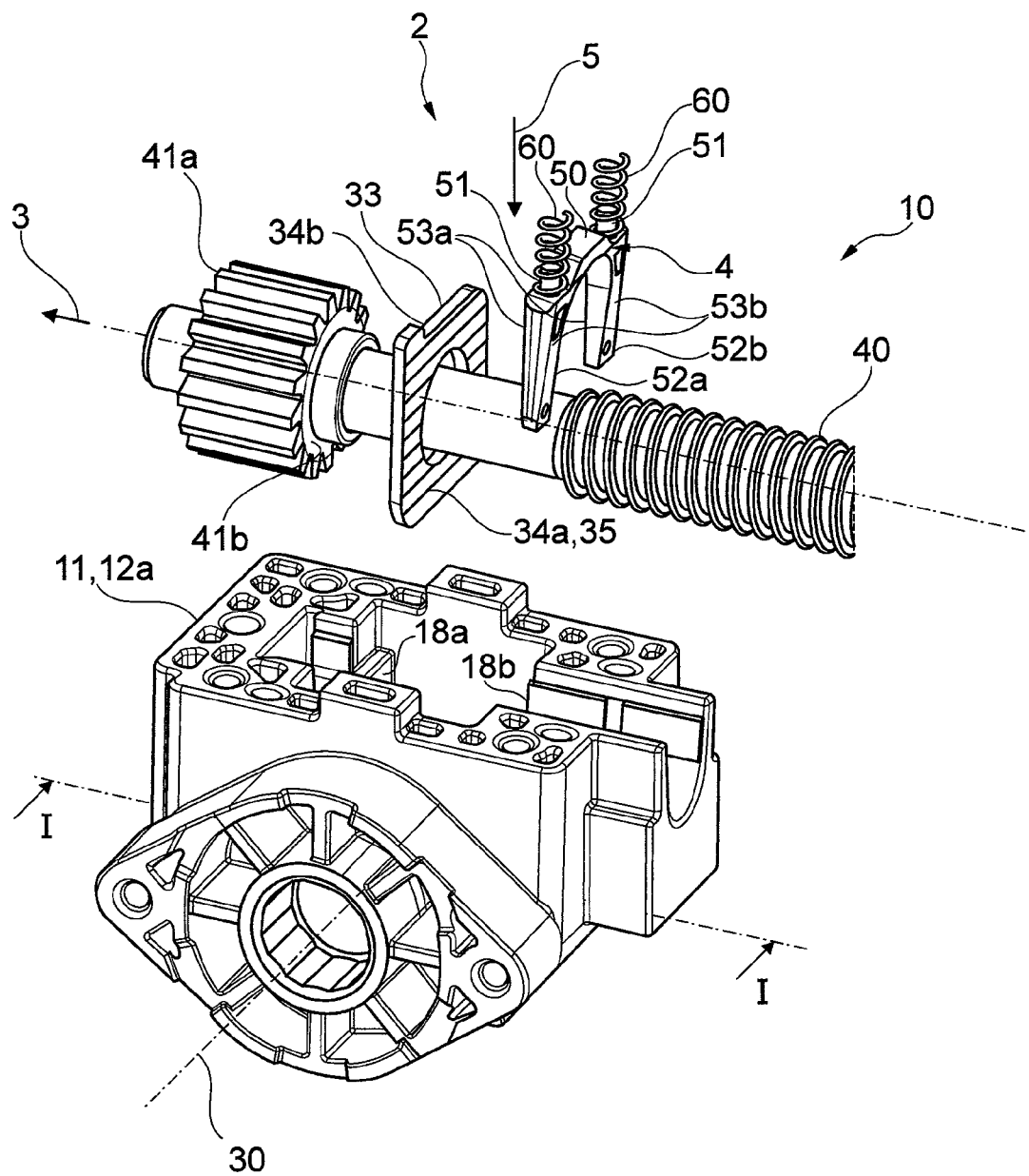
FIG. 2 shows a perspective exploded view of the transmission housing unit having a compensating arrangement from FIG. 1.

The transmission unit 1 represented in FIG. 1 and FIG. 2 substantially consists of a transmission housing unit 10, a drive shaft 30 which is drivable by an electric motor (not represented) and which is only symbolically indicated by its axial direction, a worm gear (worm 31 and worm wheel 32) mounted within the transmission housing unit 10 and a shaft 40 in the form of an output shaft of the worm gear, which is provided in the transmission housing unit 10.

The shaft 40 is executed as a spindle in the present exemplary embodiment and can in particular be used to displace movable parts in motor vehicles. The shaft 40 further constitutes a shaft within the meaning of the present invention, the axial play AS of which is compensated by an element in the form of a compensating arrangement 2, which is described further below. The axis of the drive shaft 30 is offset by 90° with respect to the axis or axial direction 3 of the shaft 40.

The transmission housing unit 10 forms a receptacle chamber for the worm gear by means of a housing base body 11 (base part 12a and housing lid 12b) in its interior.

FIG. 1 shows the section through the transmission housing unit 10 having the shaft 40 thereof and the compensating arrangement 2, omitting the housing lid 12b along the line I-I in FIG. 2.

The base part 12a and the housing lid 12b are connected to one another by means of bolts 13. The worm gear is formed in the present embodiment from a worm 31 which is configured on the drive shaft 30, which meshes with a worm wheel 32. The worm wheel 32 is arranged on the (output) shaft 40 and transfers the movement of the worm 31 to the shaft 40 which is executed as a spindle.

The housing base body 11 has a clearance hole which is adapted to the outer diameter of the shaft 40.

A wedge-shaped wedge element 50 is additionally arranged within the receptacle chamber formed in the housing base body 11. The wedge element 50 serves to compensate the axial play of the shaft 40, in other words to compensate the axial play AS in the axial direction, that is to say the axial direction 3 of the shaft 40 (i.e. in the axial shaft direction), which can be configured between the shaft 40 or the worm wheel 32 and the housing base body 11, e.g.

due to size tolerances, assembly inaccuracies or wear. The wedge element 50 grasps the shaft 40 in the form of a U or an arc.

A cylindrical extension 51 is configured at the blunt end 4 of the wedge element 50. A spring element 60 is fitted onto said extension 51 at the end. On the side opposite the extension 51, the spring element 60 is received in a blind bore 14 configured on the housing base body 11.

The wedge element 50 has two legs 52a, b.

During the assembly of the transmission unit 1, the shaft 40 is first introduced into the housing base body 11 or the base part 12a. The wedge element 50 is then located together with the spring elements 60 in the housing base body 11 or base part 12a. The housing lid or lid 12b is then screwed on.

Due to the pre-stressing of the spring element 60, the wedge element 50 is pressed, starting from the situation in FIG. 1 (axial play AS does not equal zero), into an operative position. In the operative position, the wedge element 50 is displaced by the spring element 60 in a feed direction 5, that is to say radially in the direction of the shaft axis or the axial direction 3 of the shaft 40 in such a manner until it is clamped between a second guide surface 18b configured on the housing base body 11 and an axial disk 33 which is arranged coaxially to the shaft 40 and acts as a stop element of the shaft 40, in this case a thrust washer. By advancing in the feed direction 5, a distance d between the second guide surface 18b and the second end face 41b increases due to the resulting wedge gear. In the operative position, the wedge element 50 therefore ensures an effective axial play compensation of the shaft 40. The distance d is enlarged until such time as the axial play AS is reduced to zero, by moving the shaft 40 together with the worm wheel 32 towards a first guide surface 18a, until the shaft 40 rests with a first end face 41a (of the worm wheel 32 in this case) on the guide surface 18a.

A second end face 41b (of the worm wheel 32 in this case) of the shaft 40 then rests on the second guide surface 18b, with the interposition of the compensating arrangement 2. More precisely, a second flat side 34b of the axial disk 33 rests on the second end face 19b. A second flat side 53b of the wedge element 50 rests on the second guide surface 18b and the first flat side 34a of the axial disk 33 rests on the first flat side 53a of the wedge element 50.

The wedge element 50 therefore forms the aforementioned compensating arrangement 2 together with the axial disk 33.

A second end face (of the worm wheel 32 in this case) of the shaft 40 then rests on the second guide surface 18b, with the interposition of the compensating arrangement 2. More precisely, a second flat side 34b of the axial disk 33 rests on the second end face. A second flat side 53b of the wedge element 50 rests on the second guide surface 18b and the first flat side 34a of the axial disk 33 rests on the first flat side 53a of the wedge element 50.

The axial disk 33 and, as a result, the compensating arrangement 2 are configured by a structuring 35, in this case a fluting, mounted on the first flat side 34a of the axial disk 33 such it enlarges the frictional force. The structuring 35 latches onto the first flat side 53a of the wedge element 50 which is produced from plastic in this case. A sliding back of the wedge element 50 in the direction opposite the feed direction 5 is thus prevented.

The axial disk 33 is secured against being assembled wrongly within the housing base body with the aid of the poka-yoke principle.

Figure 3:
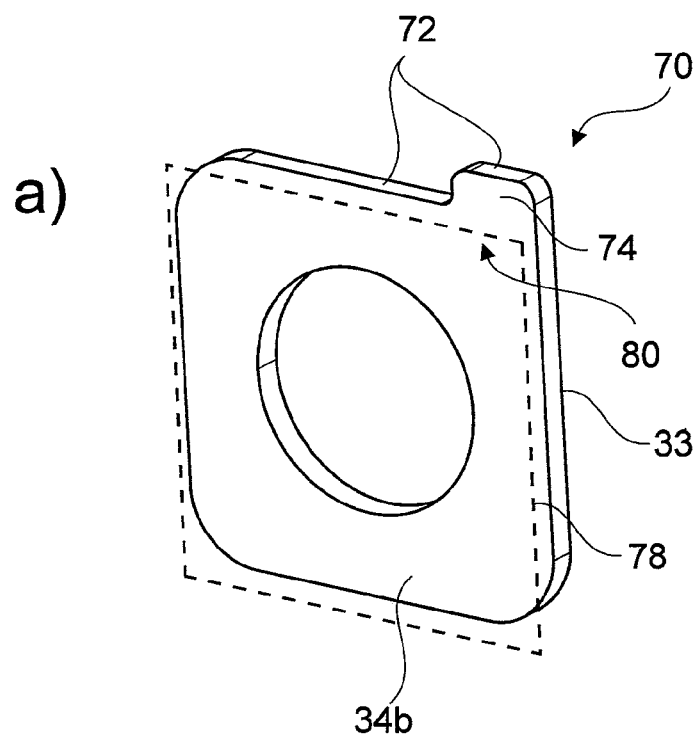
FIG. 3 shows side views of the two flat sides of the axial disk from FIGS. 1 and 2.
Figure 3:
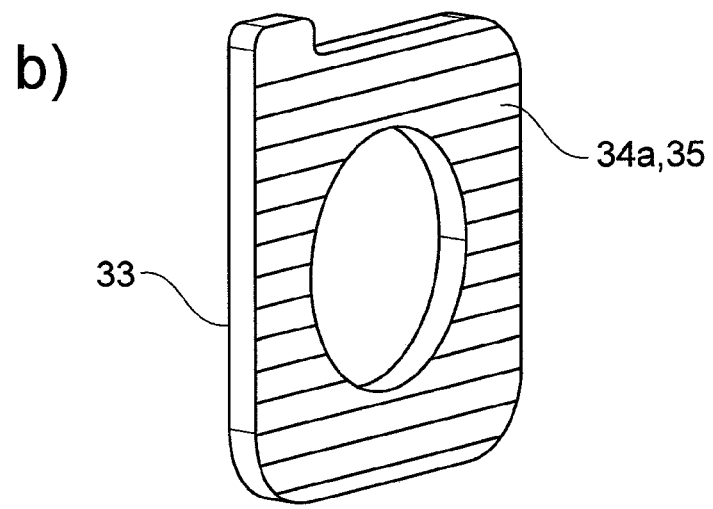

FIG. 3 shows the axial disk 33 in detail from two viewing directions: FIG. 3a shows the relatively smooth, second flat side 34b. FIG. 3b) shows the first flat side 34a having the structuring 35 in the form of a fluting. The structuring 35 runs transversely, in this case perpendicularly, to the feed direction 5 and is introduced by a plurality of parallel flutes. On the other hand, the flat side 34b is configured to lower the frictional force by chromating.

The axial disk has a geometric unbalance 70 in order to realize the poka-yoke principle. This relates to a radial outer contour 72. To this end, an extension 74 is integrally molded on the axial disk 33.

Figure 4:
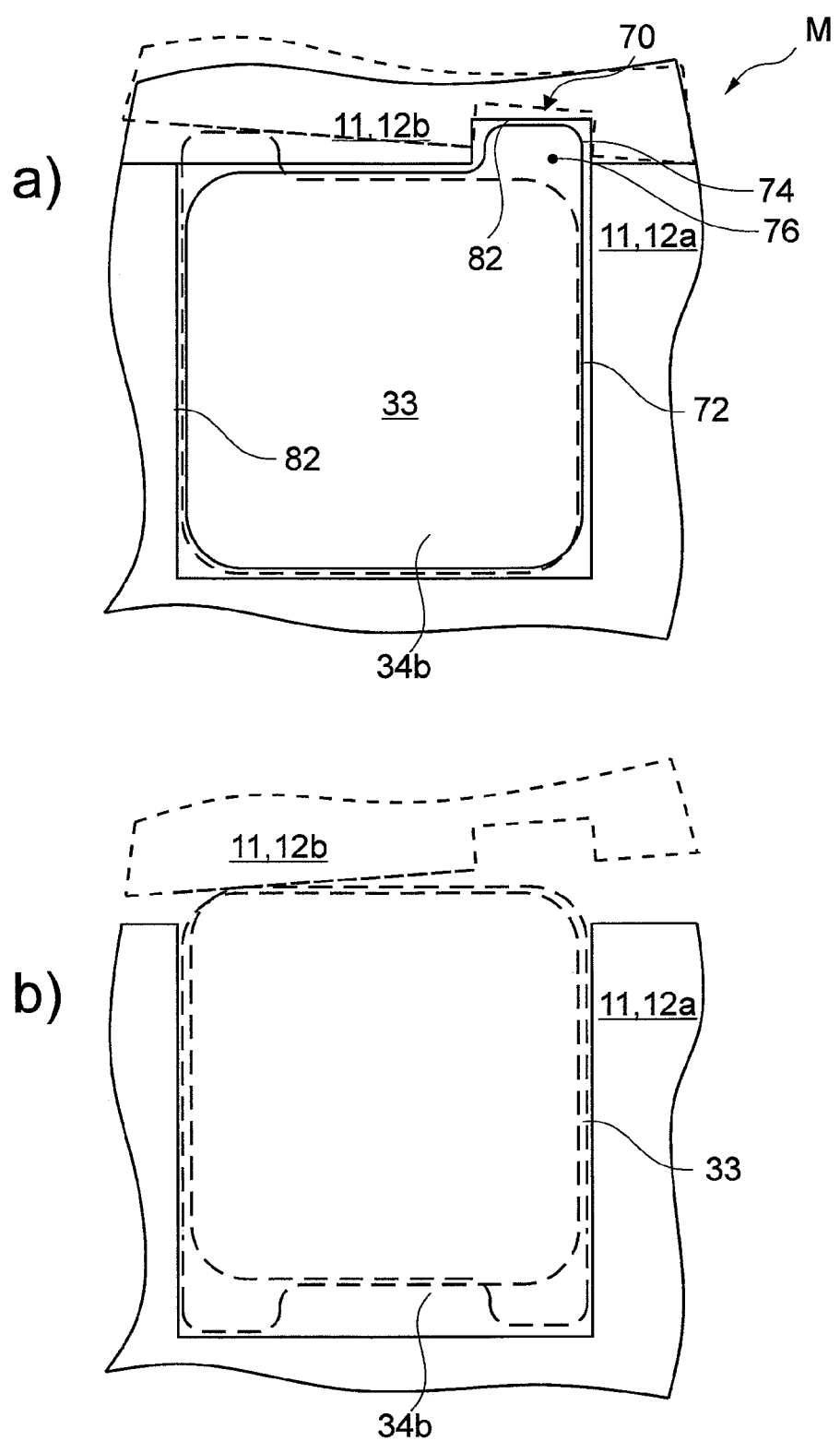
FIG. 4 shows a section along the line IV-IV in FIG. 1 of the axial disk in a a) correct installation position (solid lines) and a) and b) wrong (dashed) installation positions in the housing base body.

FIG. 4 shows the arrangement from FIG. 1 in a basic or symbolic section (plane IV in FIG. 1). Accordingly, the housing base body 11 also has the corresponding unbalance 70. In this case, this is a receiving opening 76 for the extension 74.

The unbalance 70 is executed here as follows: the axial disk 33 has an oblong or rectangular basic form 78. The unbalance 70 in the form of the extension 74 is a deviation from this basic form 78. The deviation is restricted to a portion 80 of the outer contour 72. The same applies to the housing base body 11 or the inner contour 82 thereof and the receiving opening 76.

FIG. 4 illustrates how the axial disk 33 only "fits" into the housing base body 11 in the assembly position represented by solid lines. Only in this case is the lid 12b placeable on the base part 12a in a precisely fitting manner and as intended such that an assembly condition M is produced. Neither turning of the axial disk by 180° about a perpendicular to the axial direction 3 (shown dashed in FIG. 4a) nor a respective rotation by 180° about the axial direction 3 (the two situations in FIG. 4b) allow the axial disk 33 to be reliably assembled in the housing base body 11 and, therefore, the lid 12b (now shown dashed) to be placed thereon. In all three situations which are shown dashed, the lid 12b is therefore not positionable accordingly due to mechanical blocking by the axial disk 33. The assembly condition M cannot therefore be achieved.

While specific embodiments of the invention have been shown and described in detail to illustrate the inventive principles, it will be understood that the invention may be embodied otherwise without departing from such principles.

We claim:

1. A transmission housing unit, comprising: a shaft; a housing base body for receiving the shaft extending along an axial direction, said shaft being mounted rotatably about the axial direction in the housing base body, wherein the housing base body has a first guide surface that points in an opposite direction to the axial direction transversely to the axial direction and has a second guide surface that points in the axial direction and runs obliquely to the axial direction, wherein the shaft has a first end face supported on the first guide surface and a second end face supported on the second guide surface; and a compensating arrangement that forms a wedge system that compensates play of the shaft in the housing base body, the compensating arrangement having at least two opposite flat sides and being interposed between the shaft and the housing base body, wherein, the compensating arrangement is configured in a wedge shape and is arranged in the housing base body so as to be displaceable along the second guide surface in a feed direction transversely to the axial direction, in order to increase a distance between the second guide surface and the second end face and to compensate for axial play of the shaft, wherein the compensating arrangement includes a wedge-shaped wedge element resting on the second guide surface and a plane parallel axial disk resting on the second end face, wherein the axial disk and the housing base body have corresponding geometric unbalances in accordance with the poka-yoke principle so that in an incorrect orientation of the axial disk and the housing base body relative to one another further assembly of the transmission housing unit is geometrically or mechanically prevented and so that the axial disk is only inserted in a single orientation into the housing base body in an assembled condition, wherein the unbalance on the axial disk is formed by an unsymmetrical radial outer contour of the axial disk, wherein the housing base body has a corresponding inner contour.

2. The transmission housing unit according to claim 1, wherein the unbalance is formed so that when the axial disk is inserted only a desired first flat side of the axial disk faces the second end face and a second flat side of the axial disk faces the second guide surface.

3. The transmission housing unit according to claim 1, wherein the unbalance is formed as an anti-turn locking device so that when the axial disk is inserted a rotational position of the axial disk about the axial direction is fixed with respect to the housing base body.

4. The transmission housing unit according to claim 1, wherein the radial outer contour is formed by an extension of the axial disk that projects radially outwards, and the inner contour is formed by a receiving opening for the extension.

5. The transmission housing unit according to claim 4, wherein the housing base body includes a base part and a lid, and the unbalance is limited to a portion of the inner contour and the lid contains the corresponding unbalanced portion.

6. The transmission housing unit according to claim 5, wherein the lid contains the receiving opening.

7. The transmission housing unit according to claim 4, wherein the axial disk has a rectangular basic form transversely to the axial direction, and the unbalance is a deviation from the basic form.

8. The transmission housing unit according to claim 7, wherein the deviation is the extension.

* * * * *